(12) United States Patent  
Cheng

(10) Patent No.: US 8,011,177 B2  
(45) Date of Patent: Sep. 6, 2011

(54) EXHAUST PARTICULATE FILTER

(75) Inventor: Shi-Wai S. Cheng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1068 days.

(21) Appl. No.: 11/833,558

(22) Filed: Aug. 3, 2007

(65) Prior Publication Data

US 2007/0266701 A1    Nov. 22, 2007

Related U.S. Application Data

(63) Continuation-in-part of application No. 11/335,222, filed on Jan. 19, 2006, now Pat. No. 7,716,921.

(60) Provisional application No. 60/713,541, filed on Sep. 1, 2005.

(51) Int. Cl.  
*F01N 3/00*    (2006.01)

(52) U.S. Cl. ............. 60/286; 60/274; 60/276; 60/295; 60/297; 60/303; 60/311

(58) Field of Classification Search ............ 60/274, 60/276, 286, 295, 297, 303, 311  
See application file for complete search history.

(56) References Cited

U.S. PATENT DOCUMENTS

| | | | |
|---|---|---|---|
| 4,404,795 A | 9/1983 | Oishi et al. ............ 60/274 |
| 4,426,320 A | 1/1984 | Ernest et al. ............ 502/313 |
| 4,887,427 A | 12/1989 | Shinzawa et al. ............ 60/286 |
| 4,934,142 A | 6/1990 | Hayashi et al. ............ 60/297 |
| 5,019,142 A | 5/1991 | Waschkuttis ............ 55/429 |
| 5,067,320 A | 11/1991 | Kanesaki ............ 60/297 |
| 5,193,340 A | 3/1993 | Kamihara |
| 6,823,660 B2 | 11/2004 | Minami ............ 60/280 |
| 6,915,629 B2 * | 7/2005 | Szymkowicz ............ 60/286 |
| 7,047,729 B2 * | 5/2006 | van Nieuwstadt et al. ..... 60/295 |
| 7,322,182 B2 * | 1/2008 | Ueno et al. ............ 60/295 |
| 7,562,523 B2 * | 7/2009 | Yezerets et al. ............ 60/286 |
| 7,607,290 B2 * | 10/2009 | Matsuoka et al. ............ 60/286 |
| 2005/0050870 A1 | 3/2005 | Cheng ............ 55/523 |
| 2006/0225409 A1 | 10/2006 | Kuboshima et al. |

FOREIGN PATENT DOCUMENTS

| | | |
|---|---|---|
| CN | 1461379 A | 12/2003 |
| CN | 1504630 A | 6/2004 |
| WO | WO 01/96717 | 12/2001 |

OTHER PUBLICATIONS

English Abstract for CN1461379; Publication Date: Dec. 10, 2003; 1 pg.  
English Abstract for CN1504630; Publication Date: Jun. 16, 2004; 1 pg.  
International Search Report for PCT/US06/33987 filed Aug. 31, 2006 dated Mar. 21, 2007 and corresponding to the subject application.

* cited by examiner

*Primary Examiner* — Thomas E Denion  
*Assistant Examiner* — Diem Tran

(57) ABSTRACT

A method and system is disclosed for regenerating a particulate filter for an exhaust system. A source of hydrocarbon is injected into the exhaust flow upstream of the filter. The injected hydrocarbon within the filter is caused to oxidize and a temperature within the filter to rise, the temperature rise being initiated at a downstream end of the filter. A temperature change at the filter is sensed in response to the oxidation of the hydrocarbon. The amount of hydrocarbon being injected into the filter is adjusted to increase the temperature within the filter above a defined threshold from the downstream end to an upstream end of the filter, the defined threshold temperature being sufficient to oxidize soot. An operational parameter indicative of the filter regeneration being complete is sensed, and further injection of the hydrocarbon into the exhaust flow is prevented in response to the sensed operational parameter.

20 Claims, 10 Drawing Sheets

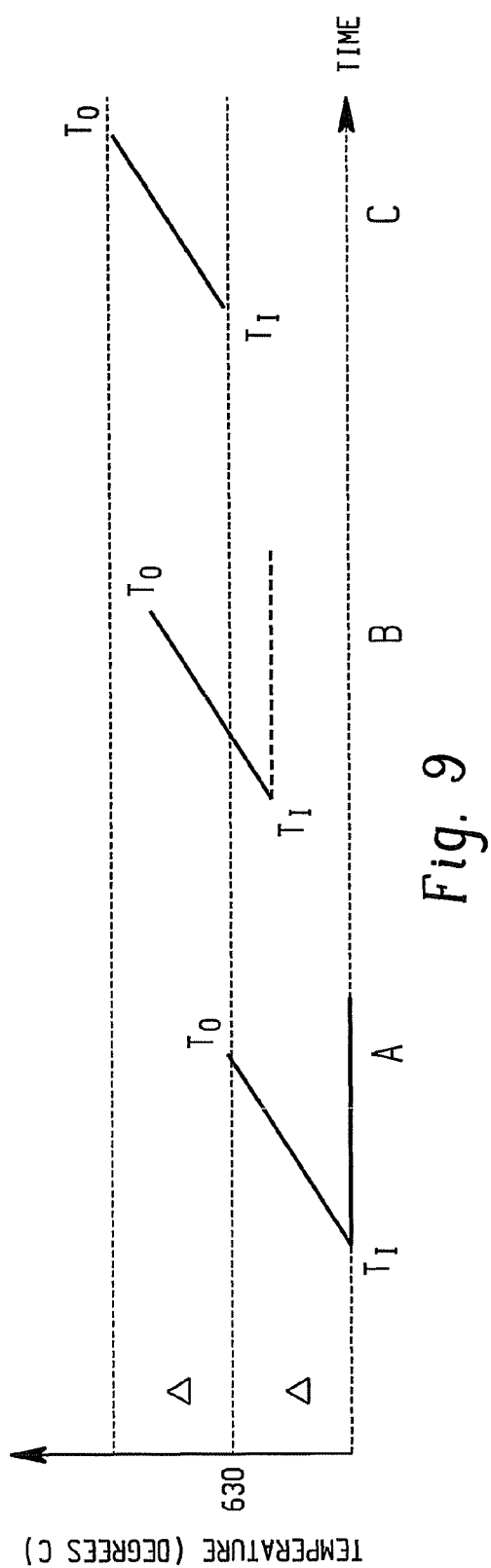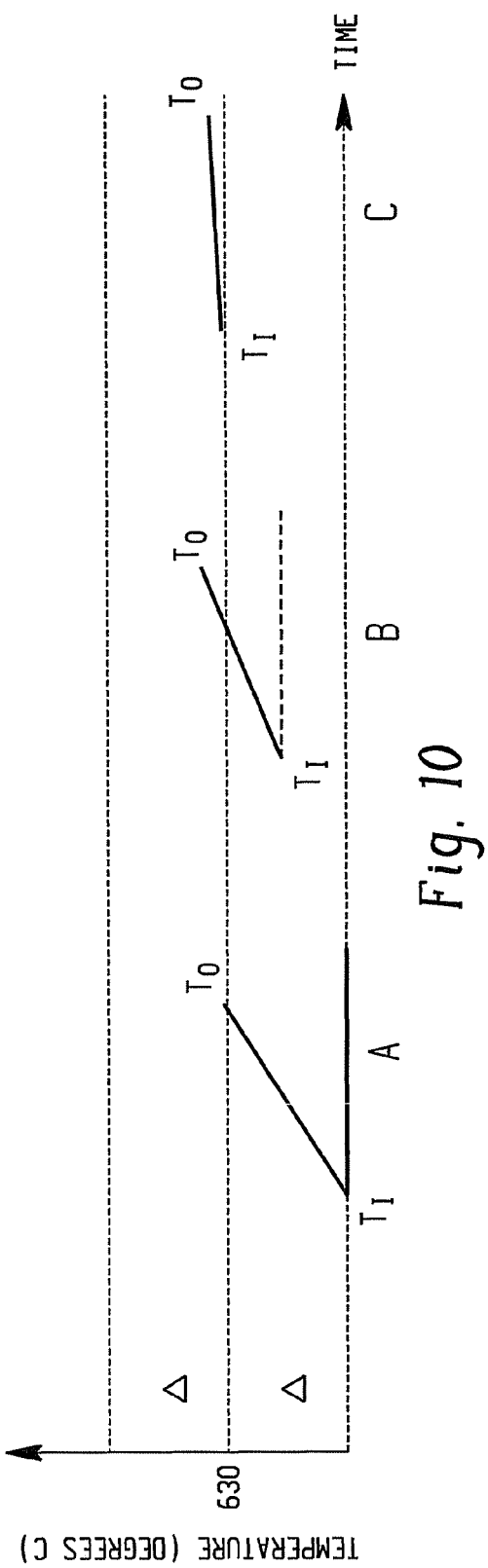

EXHAUST PARTICULATE FILTER

CROSS REFERENCE TO RELATED APPLICATIONS

This application is a continuation-in-part application of U.S. application Ser. No. 11/335,222 filed Jan. 19, 2006, which claims the benefit of U.S. Provisional Application Ser. No. 60/713,541 filed Sep. 1, 2005, each of which are incorporated herein by reference in their entireties.

BACKGROUND OF THE INVENTION

The present disclosure relates generally to an exhaust system, and particularly to a particulate filter for a diesel exhaust system.

Automotive exhaust systems for diesel and other internal combustion engines typically include a filtration system that limits the mass of particulate matter emitted with the exhaust gases. In diesel engine systems, this matter typically includes carbonaceous matter (soot) and ash particles. Present filtering methods to trap the exhaust particulates focus on wall-flow filtration. Wall-flow filtration systems typically have a high filtration efficiency not only for exhaust particulates but also for ash particles. Catalyzed diesel particulate filters have been used extensively, where the catalyst is normally applied either to the front end of the diesel particulate filter or applied to the whole filter for the purpose of reducing the regeneration temperature. Catalytic or thermal arrangements within the exhaust system, which serve to effect regeneration of the filtration element, tend to create high temperatures within the filtration body, which tends to limit the choice of materials for the filtration body. In view of present particulate filter arrangements, it is desirable to have a more advanced particulate filter that can operate with effective filtration and improved regeneration.

SUMMARY OF THE INVENTION

An embodiment of the invention includes a method for regenerating a particulate filter for an exhaust system configured to receive an exhaust flow. In the method, a source of hydrocarbon is injected into the exhaust flow upstream of the filter. The injected hydrocarbon within the filter is caused to oxidize and a temperature within the filter to rise, the temperature rise being initiated at a downstream end of the filter by virtue of the direction of exhaust flow. A temperature change at the filter is sensed in response to the oxidation of the hydrocarbon. The amount of hydrocarbon being injected into the filter is adjusted to increase the temperature within the filter above a defined threshold from the downstream end to an upstream end of the filter, the defined threshold temperature being sufficient to oxidize soot, the elevated temperature above the defined threshold temperature thereby serving to regenerate the filter. An operational parameter indicative of the filter regeneration being complete is sensed, and further injection of the hydrocarbon into the exhaust flow is prevented in response to the sensed operational parameter.

Another embodiment of the invention includes a control system for regenerating a particulate filter for an exhaust system configured to receive an exhaust flow, the control system includes a fuel injector, a temperature sensor, a controller, and a sensor for sensing an operational parameter indicative of the filter regeneration being complete. The fuel injector is disposed for injecting a source of hydrocarbon into the exhaust flow upstream of the filter. The temperature sensor is disposed for sensing a temperature change at the filter in response to oxidation of the hydrocarbon and a resulting temperature rise within the filter, the temperature rise being initiated at a downstream end of the filter by virtue of the direction of exhaust flow. The controller is responsive to the temperature sensor for adjusting the amount of hydrocarbon being injected into the filter to increase the temperature within the filter above a defined threshold from the downstream end to an upstream end of the filter, the defined threshold temperature being sufficient to oxidize soot, the elevated temperature above the defined threshold temperature thereby serving to regenerate the filter. The controller is responsive to the sensed operational parameter to prevent further injection of the hydrocarbon into the exhaust flow in response to the filter regeneration being complete.

BRIEF DESCRIPTION OF THE DRAWINGS

Referring to the exemplary drawings wherein like elements are numbered alike in the accompanying Figures:

FIGS. 9-11 depict targeted control scenarios for practicing embodiments of the invention;

DETAILED DESCRIPTION OF THE INVENTION

An embodiment of the invention provides a particulate filter for an exhaust system of an automotive diesel engine having improved regeneration features. While the embodiment described herein depicts an automotive diesel engine as an exemplary diesel powerplant using a particulate filter, it will be appreciated that the disclosed invention may also be applicable to other diesel powerplants that require the functionality of the particulate filter herein disclosed, such as a diesel powered generator for example. While the disclosed invention is well suited for filtering the combustion byproducts of a diesel engine, it may also be applicable for filtering combustion byproducts of a gasoline powered engine.

Figure 1:
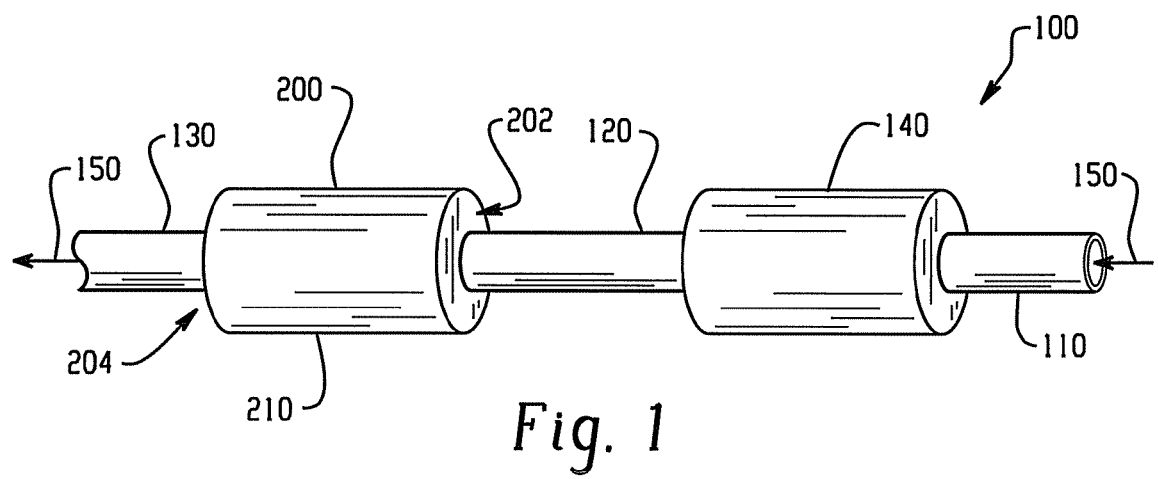
FIG. 1 depicts an exhaust system employing an embodiment of the invention.

An exemplary exhaust system 100 for an automotive diesel engine (not shown) is depicted in FIG. 1 having a manifold exhaust pipe 110 suitably connected at one end to an exhaust manifold (not shown) of the diesel engine (not shown) for receiving an exhaust flow depicted generally as numeral 150. Turbocharger 140 is suitably connected to intermediate manifold exhaust pipe 110 and intermediate exhaust pipe 120. Intermediate exhaust pipe 120 is suitably connected to a particulate filter 200 for trapping exhaust particulates present in the exhaust flow 150, which is suitably connected to an exhaust pipe 130. A tailpipe (not shown) for exhausting the conditioned exhaust flow to atmosphere is suitably connected to exhaust pipe 130. Exhaust system 100 manages the exhaust flow 150 by controlling how the exhaust flow 150 passes from exhaust manifolds (not shown) to manifold exhaust pipe 110, turbocharger 140, intermediate exhaust pipe 120, particulate filter 200, exhaust pipe 130, and then to atmosphere. Exhaust system 100 has a nominal flow area equal to or greater than the inside cross-sectional flow area of manifold exhaust pipe 110.

Figure 2:
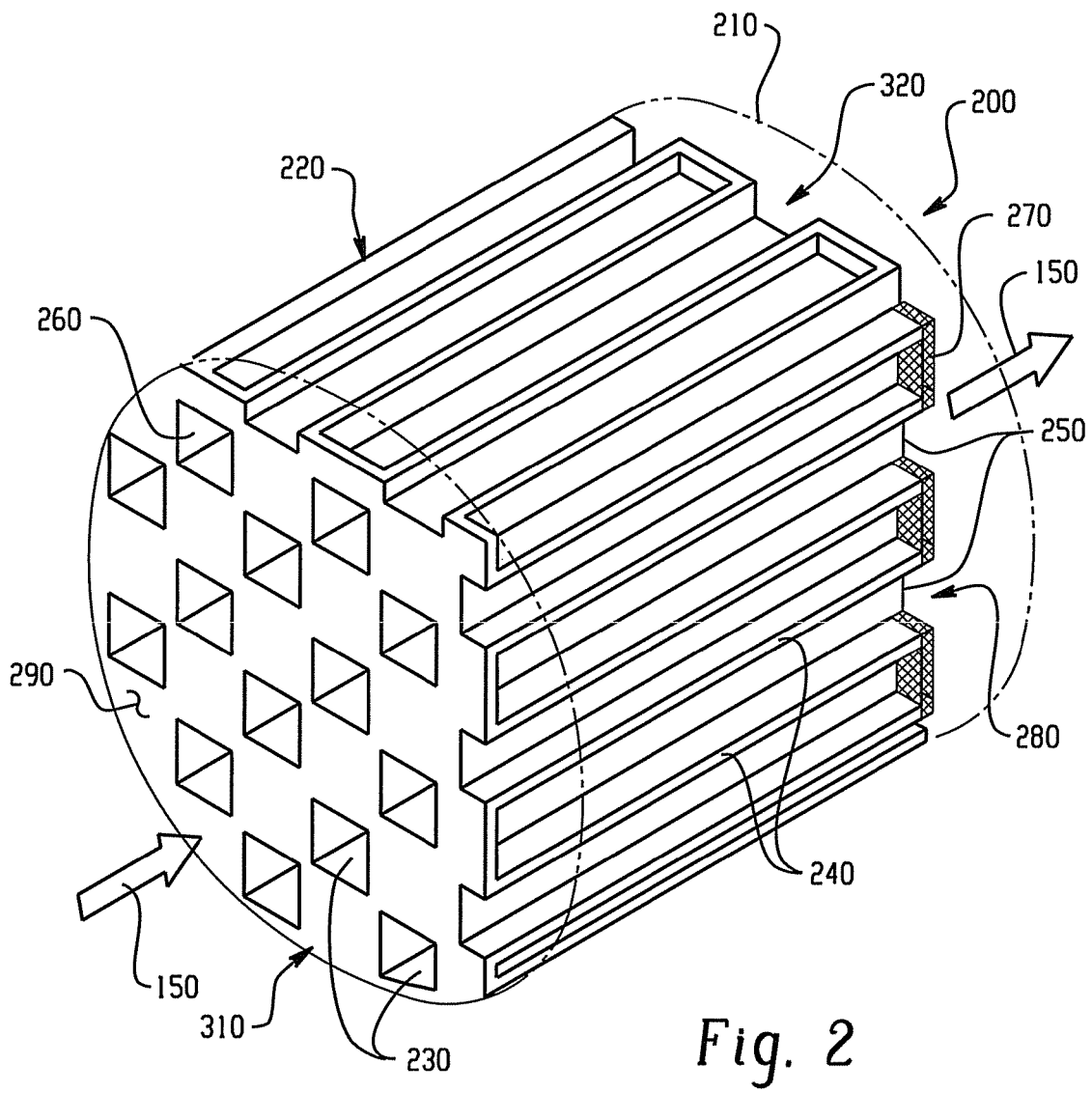
FIG. 2 depicts an isometric view of a particulate filter in accordance with an embodiment of the invention.

Each particulate filter 200 has a housing 210, which may be any form of construction and configuration suitable for the purpose, and a filter element 220 suitably contained within housing 210, best seen by now referring to FIG. 2. In an embodiment, filter element 220 is a ceramic monolith structure. Filter element 220 is of the wall-flow filtration type, meaning that exhaust flow 150 passes from the inlet channels 230, through the porous internal walls 240, to the outlet channels 250. Filtering of the exhaust flow 150 primarily occurs as exhaust flow 150 passes through the pores of internal walls 240, hence the term wall-flow filtration. Filter element 220 is configured to trap exhaust particulates.

In an exemplary embodiment, inlet channels 230 each have an inlet port 260 at one end 310 and a non-porous end-plug 270 at the opposite end 320. In an embodiment, the non-porous end-plugs 270 are substantially thicker (such as 0.25-0.5 inches for example) than the filter wall (such as 0.010-0.020 inches for example). In an alternative embodiment, non-porous end-plug 270 may be replaced by a porous end-plug 270'. End-plug 270 is also herein referred to as a standard end-plug for purposes of distinction. Embodiments of the invention may be applied to a particulate filter 200 having either a standard end-plug 270 or a porous end-plug 270'. In the various drawings, reference numeral 270 may be replaced with reference numeral 270' when reference is made to a porous end-plug. Outlet channels 250 each have an outlet port 280 at one end 320 and an end-plug 290 at the opposite end 310. Exhaust flow 150 enters filter element 220 at inlet ports 260, passes through porous internal walls 240, and is discharged from filter element 220 at outlet ports 280. In this manner, inlet channels 230 and outlet channels 250 are referred to as being in fluid communication with each other via internal walls 240. Internal walls 240 of filter element 220 are fabricated with a pore size less than about 30 micrometers, thereby enabling the entrapment of exhaust particulates. In an embodiment, porous end plugs 270 have a pore sized equal to or greater than about 30 micrometers, and equal to or less than about 60 micrometers. End-plugs 290 may be solid or may have a porosity similar to that of internal walls 240. In this manner, the artisan will readily recognize that in general, porous end-plugs 270 have a greater porosity than end-plugs 290.

Figure 3:
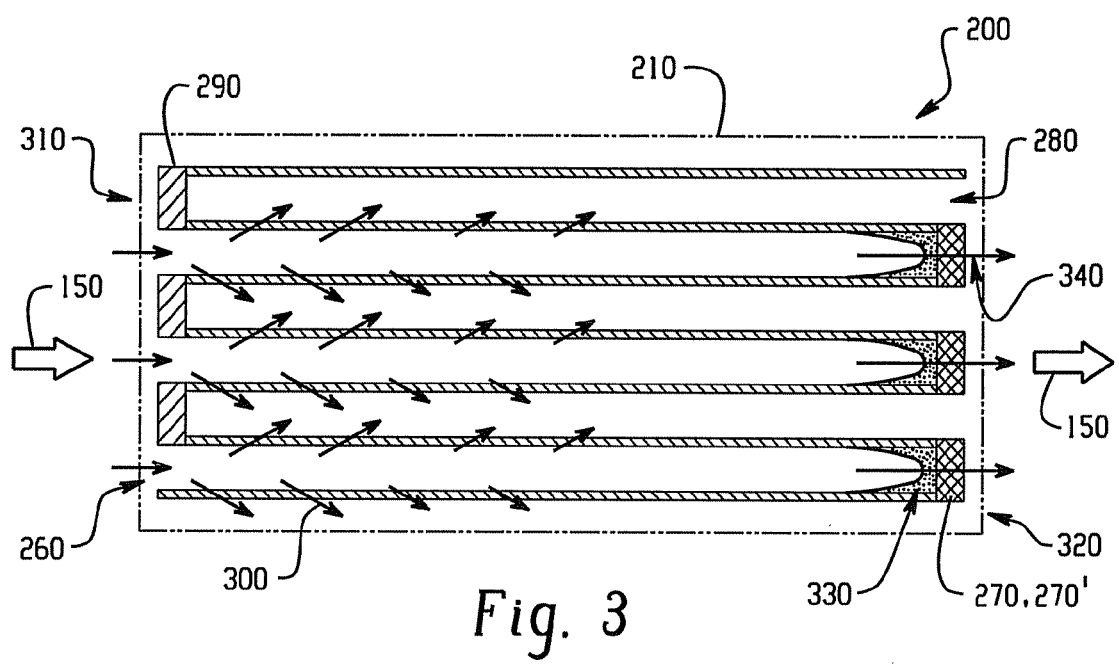
FIG. 3 depicts a cross section view of a particulate filter similar to that of FIG. 2 and in accordance with an embodiment of the invention.

In an embodiment depicted in FIG. 2, filter element 220 is a ceramic monolith structure having a plurality of porous internal walls 240 that define and separate the inlet and outlet channels 230, 250. Inlet and outlet channels 230, 250 are arranged parallel to the direction of exhaust flow 150, resulting in a sideways flow (depicted generally by arrows 300 in FIG. 3) as exhaust flow 150 passes through internal walls 240. Housing 210 includes a first end 310 and a second end 320. Inlet ports 260 and end-plugs 290 are arranged at first end 310, and outlet ports 280 and porous end-plugs 270 are arranged at second end 320. In an embodiment, and as depicted illustratively in FIGS. 2 and 3, the overall surface area of porous end-plugs 270 is substantially less than the total surface area of internal walls 240, with an exemplary ratio being less than about 1:240.

Outlet channels 250 have outlet ports 280 at second end 320 to discharge exhaust flow 150 and end-plugs 290 at first end 310 to block the incoming exhaust flow 150. Exhaust flow 150 is filtered at the ceramic monolith structure 220 as it passes through the porous walls 240 between inlet and outlet channels 230, 250. Exhaust byproducts, such as metallic particles and carbonaceous matter, are trapped at porous walls 240, end-plugs 290, and porous end-plugs 270. The filtered exhaust flow 150 is then discharged at outlet ports 280.

As discussed above, porous end-plugs 270 may be replaced with standard end-plugs 270', and unless otherwise specified the discussion that follows applies to both.

A diesel particulate filter (dpf), such as the particulate filter 200 and more particularly filter element 220, requires regeneration from time to time. Normally regeneration is initiated by increasing the inlet temperature of the exhaust gases at first end 310 to a temperature higher than 650° C. At this temperature, soot deposited on the filter walls 240 will react with the oxygen in the exhaust gases and will be converted into CO and $CO_2$. This reaction is strongly exothermic. The reaction and the associated heat will propagate toward the downstream side of the filter to second end 320, which causes high temperature near the second end 320 of the filter. As the soot deposited at the first end 310 of the filter is oxidized, some of the exhaust gases will flow through the filter wall 240 and flow out the filter through the exit channels (outlet channels) 250. Consequently, less flow will pass through the yet to be regenerated part of the inlet channels 230.

Figure 4:
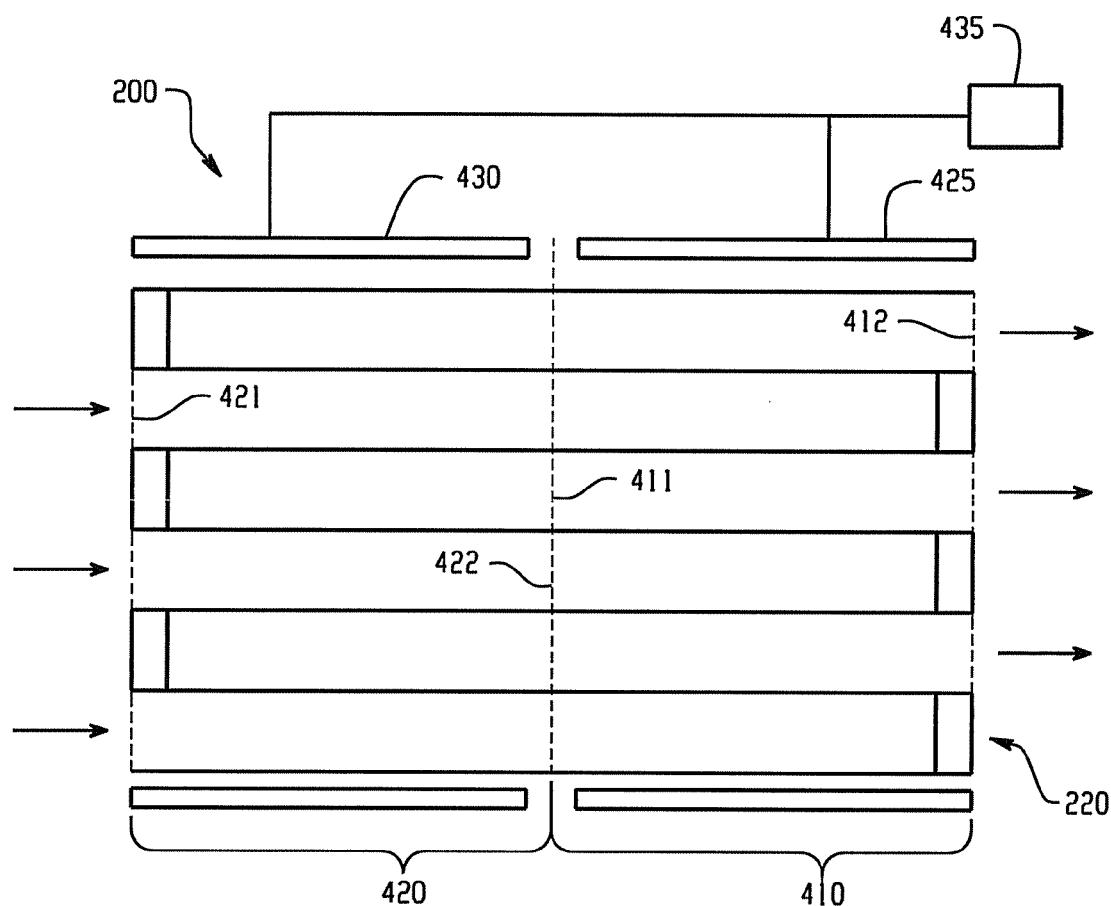
FIG. 4 depicts in schematic view an embodiment of a particulate filter in accordance with and embodiment of the invention.

To improve upon the regeneration of particulate filter 200, an embodiment of the invention provides for staged regeneration, that is, the length of particulate filter 200, from first end 310 to second end 320, is arranged into zones, such as first zone 410 and second zone 420 for example, best seen by referring to FIG. 4, with regeneration occurring in first zone 410 and then in second zone 420. While an embodiment of the invention is depicted and described herein having only two zones, it will be appreciated that any number of zones may be applied in accordance with embodiments of the invention, and that the scope of the invention is not limited to only the two-zone arrangement depicted and described herein.

Each zone 410, 420 has a front end 411, 421 and a back end 412, 422, respectively. In response to a demand for regeneration, the downstream first zone 410 is caused to regenerate first, beginning at its front end 411 and progressing with the flow to its back end 412, and then the upstream second zone 420 is caused to regenerate second, beginning at its front end 421 and progressing with the flow to its back end 422. With the regeneration progressing from downstream first zone 410 (front to back) then to upstream second zone 420 (front to back), the regeneration of particulate filter 200 is said to be staged.

From the foregoing, it will be appreciated that no matter how many regeneration zones there are in particulate filter 200, the staged regeneration is caused to take place beginning at the downstream zone with progression toward the upstream zone, with each zone regenerating from front to back in the direction of the flow.

The regeneration of each zone may be caused by heaters 425, 430 or activation of a catalyst 405, which will be discussed in more detail below.

While FIG. 4 is depicted having heating elements 425, 430 along the entire length of first and second zones 410, 420, respectively, it will be appreciated that only the first zone 410 may have a heater 425, and that heater 425 may only be disposed proximate the front end 411 of first zone 410, since the generated heat will naturally flow in the direction of the exhaust flow toward the rear end 412 of first zone 410. In an alternative embodiment, a similar arrangement may also be applied for the second zone 420.

Figure 5A:
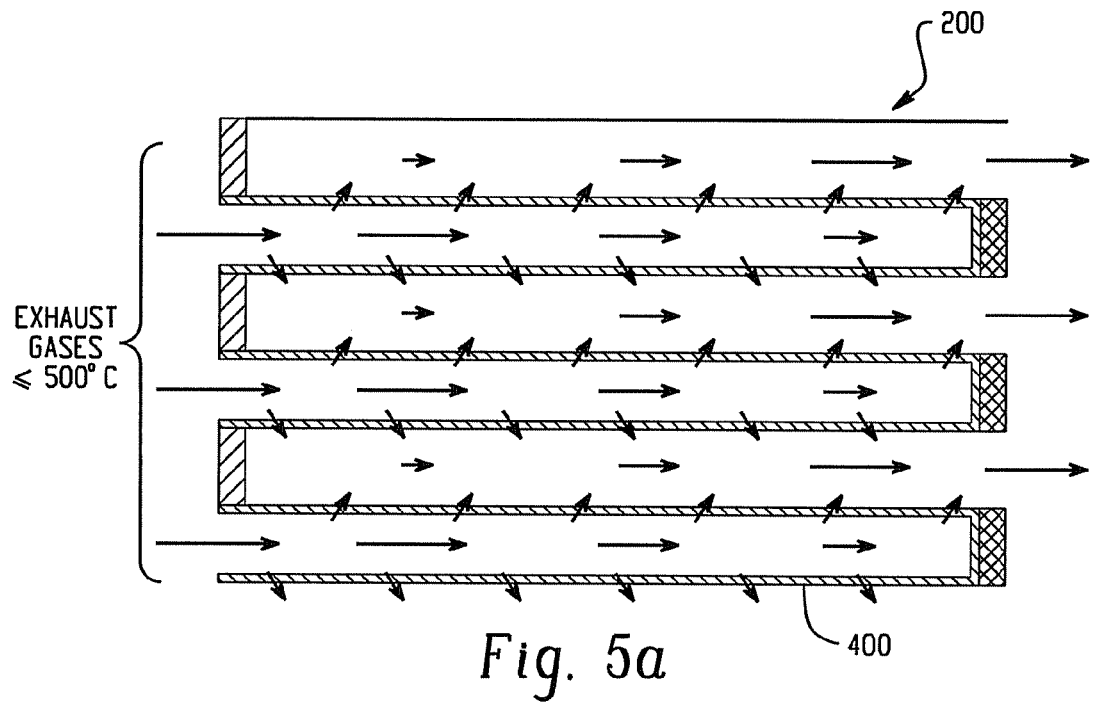
FIGS. 5*a*-5*b*, 6*a*-6*b*, and 7, depict alternative cross section views of a particulate filter similar to that of FIG. 2 under varying operating conditions and in accordance with an embodiment of the invention.
Figure 5B:
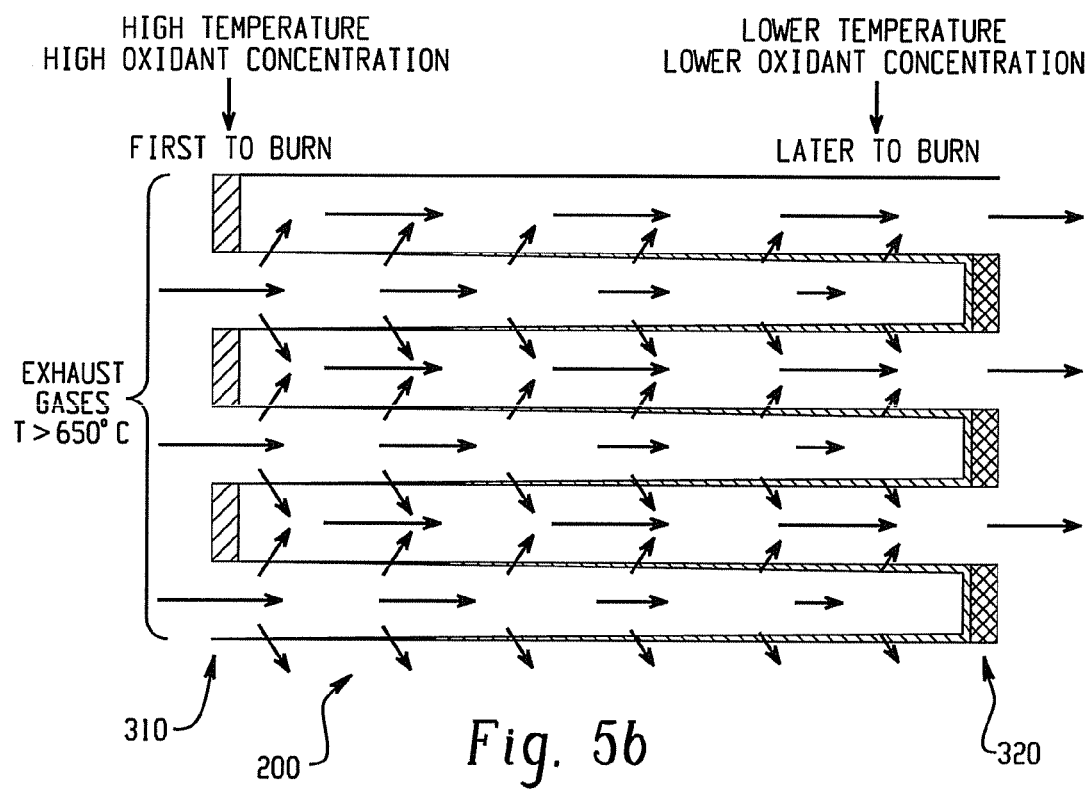

Reference is now made to FIGS. 5a and 5b, which depict a conventional dpf regeneration. FIG. 5a illustrates uniform accumulation of soot 400 on filter walls 240 with an inlet exhaust gas temperature of less than about 500° C. FIG. 5b illustrates the initiation of regeneration at the first end 310 of the dpf 220, where the inlet exhaust gas temperature has been elevated to greater than about 650° C. Here, the exhaust temperature may be raised by introducing some fuel into the exhaust system, or an oxidation catalyst upstream from the dpf may be used to oxidize the fuel and increase the exhaust temperature, or the exhaust temperature may be raised by an electrical heater located upstream from the dpf. In FIG. 5b, dpf 220 experiences a high temperature and a high oxidant concentration at the first end 310, and a respectively lower temperature and lower oxidant concentration at the second end 320. Consequently, and with reference still to FIG. 5b, the soot 400 at first end 310 would burn, without the assistance of an embodiment of the invention, before the soot 400 at second end 320. This in turn causes the exhaust flow through walls 240 from inlet channels 230 to outlet channels 250 to be concentrated toward the first end 310 of dpf 220, causing a lower flow rate through walls 240 toward the second end 320. As a consequence, the lower flow rate reduces the capacity for the exhaust gases to carry away the heat generated by oxidation of the soot 400. This situation may result in thermal run away for the soot deposits near the closed end (second end 320) of the inlet channels 230, which may lead to the filter degradation (melting or cracking of the filter).

Figure 6A:
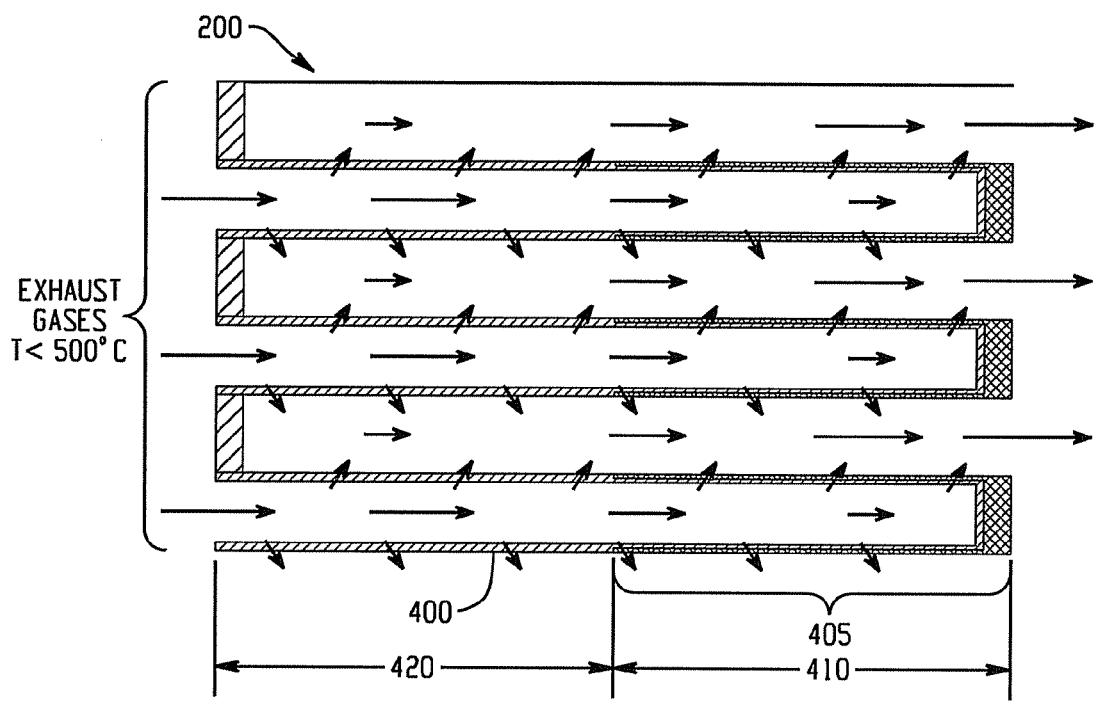

To avoid a thermal run away condition and protect the integrity of the diesel particulate filter 200, an embodiment of the invention includes a catalyzed filter element 220 having an oxidation catalyst 405 disposed at the last 25-50% of the filter element 220 (first zone 410). While embodiments are disclosed herein having an oxidation catalyst disposed over a defined percentage of the filter element length, it will be appreciated that this is for illustration purposes only, and that other embodiments may have a different percentage of catalyst coverage. FIG. 6a illustrates a zone-coated catalyzed filter 220 having an oxidation catalyst 405 disposed at first zone 410 on about the last 25% of the internal walls 240 toward the second end 320. Since the catalyst 405 can lower the ignition temperature of the soot deposits 400, the soot-oxygen reaction can be initiated proximate the back end (second end 320) of the filter 220 first, which will serve to remove the soot 400 deposited near the closed end (second end 320) of the inlet channel 230 first. More specifically, and as discussed previously, regeneration of filter element 220 at first zone 410 takes place in a direction with the flow from front end 411 toward back end 412 of first zone 410 (see also FIG. 4 depicting reference numerals 411 and 412). As a consequence, more exhaust gases will flow along the inlet channels 230 before they cross the internal walls 240 to the outlet channels 250. The resulting higher flow rate down the inlet channels 230 allows better heat transfer through convection, and thus, serves to lower the peak temperature and the associated thermal stress on the filter element 220 during filter regeneration. Furthermore, by the time the first end 310 is ignited, that is, the second zone 420 being elevated above the temperature of about 650° C., there is little or no soot 400 remaining at the first zone 410 near the closed end (second end) 320 of filter element 220. When the thermal energy associated with regeneration propagates to the closed end (second end) 320, there is little or no additional energy to be released on the closed end, which is where the temperature is normally the highest with a conventional regeneration method.

Figure 6B:
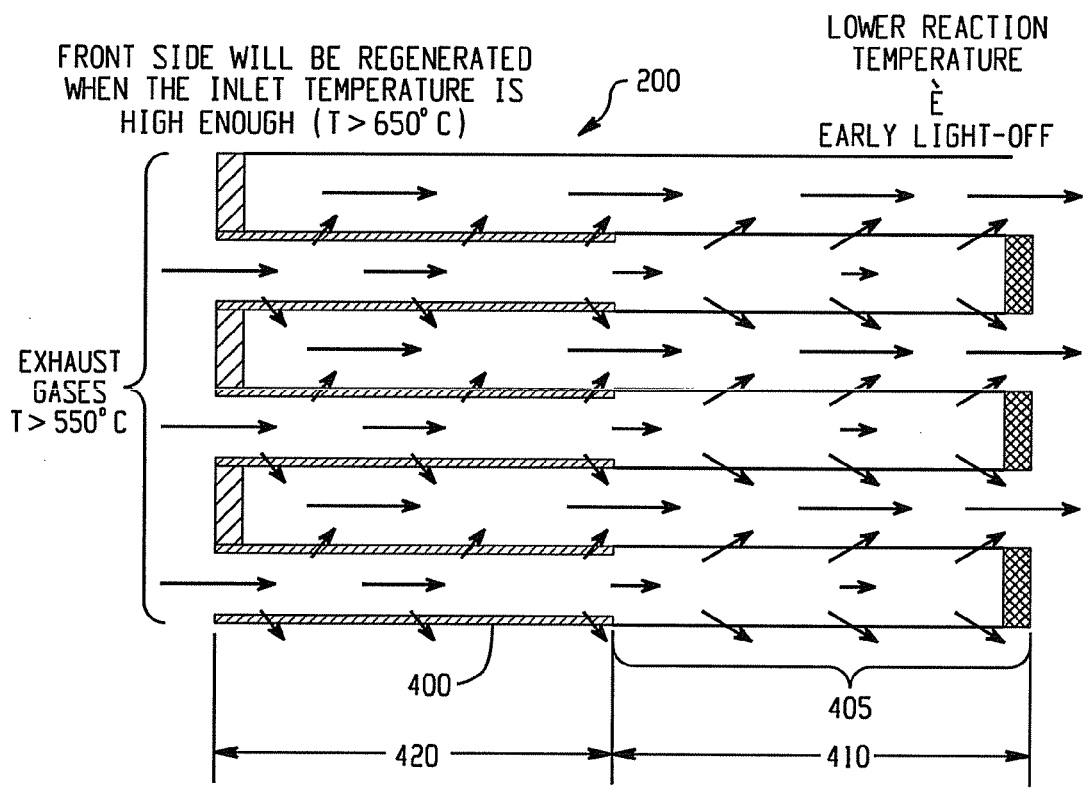

FIG. 6b illustrates the dpf 200 of FIG. 6a, but with an inlet exhaust temperature of about 550° C. or greater. With the catalyst 405 at the first zone 410 proximate the second end 320 effectively lowering the ignition temperature of the soot 400 by about 100° C. from about 650° C. to about 550° C., ignition of the soot 400 occurs first at the first zone 410. The second zone 420 is regenerated when the inlet exhaust temperature reaches or exceeds about 650° C.

Figure 7:
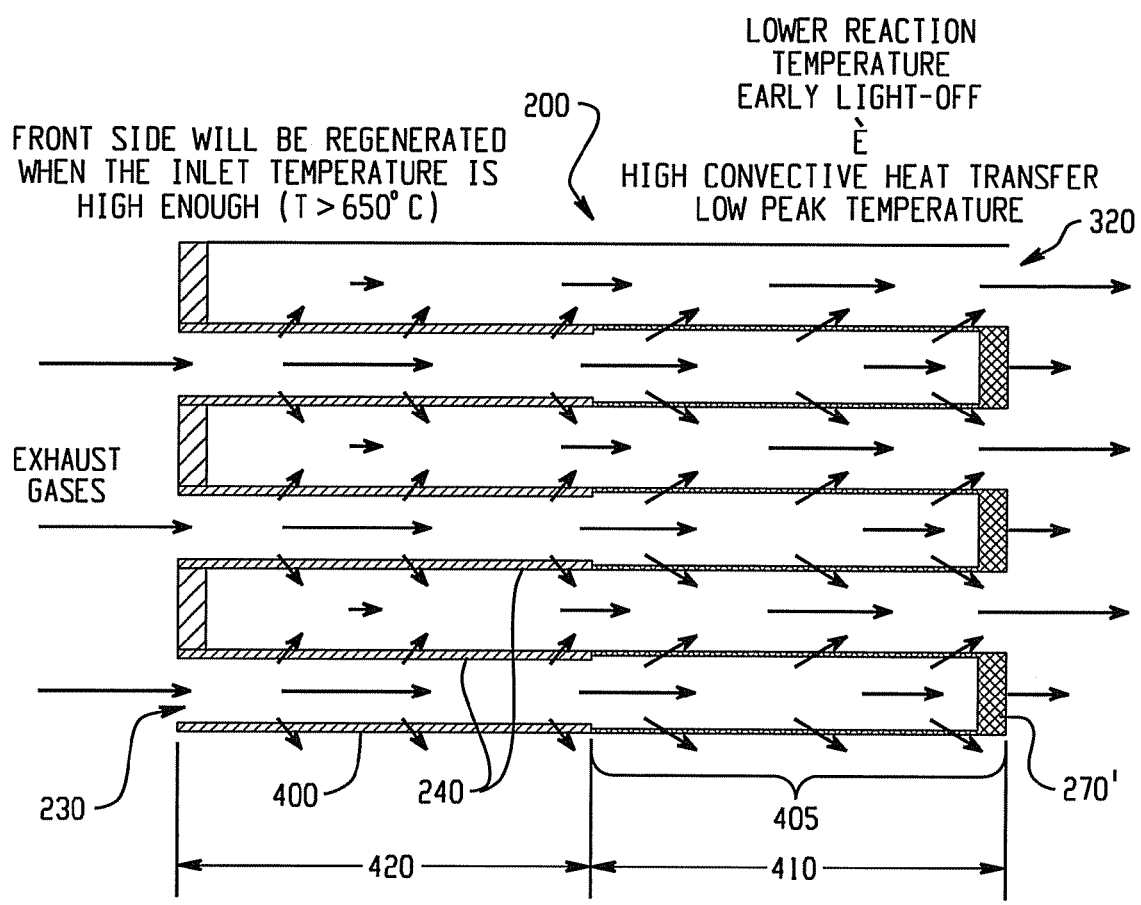

As previously discussed, embodiments of the invention may employ standard end-plugs 270 or porous end-plug 270'. FIG. 7 illustrates the dpf 200 with porous end-plugs 270' and a catalyst 405 disposed over the last 25-50% of the internal walls 240 toward the second end 320. The porous end-plugs 270' allow more flow to pass through the inlet channels 230 to the closed end, thereby further lowering the peak temperature near the closed end (second end) 320.

As previously discussed, regeneration at first and second zones 410, 420 may be initiated by auxiliary heaters 425, 430, rather than by a catalyst 405, which may be controlled by a control system 435 for providing controlled heating (best seen by referring to FIG. 4). In another embodiment, a combination of heaters and a catalyst may be employed. Heaters 425, 430 may be electric heaters, microwave heaters, or any heating device suitable for the purposes disclosed herein. Collectively, heaters 425, 430, catalyst 405, or other means of heating, such as activated soot for example, are herein referred to as heat sources.

When used as herein disclosed, filter element 220 may be made from Cordierite ($Mg_2Al_4Si_5O_{18}$, Magnesium Aluminum Silicate) or SiC (Silicon Carbide), which are two ceramic materials that may be used for manufacturing ceramic dpfs. Regarding Cordierite with forced regeneration, however, the peak temperature of conventional regeneration may be too high for the Cordierite dpf, which may cause it to either crack or melt. Consequently, this characteristic tends to dissuade the use of Cordierite for dpf's despite its low cost. Only from the teachings disclosed herein does the unexpected advantage arising from embodiments of the invention provide for the use of a Cordierite dpf.

Figure 8:
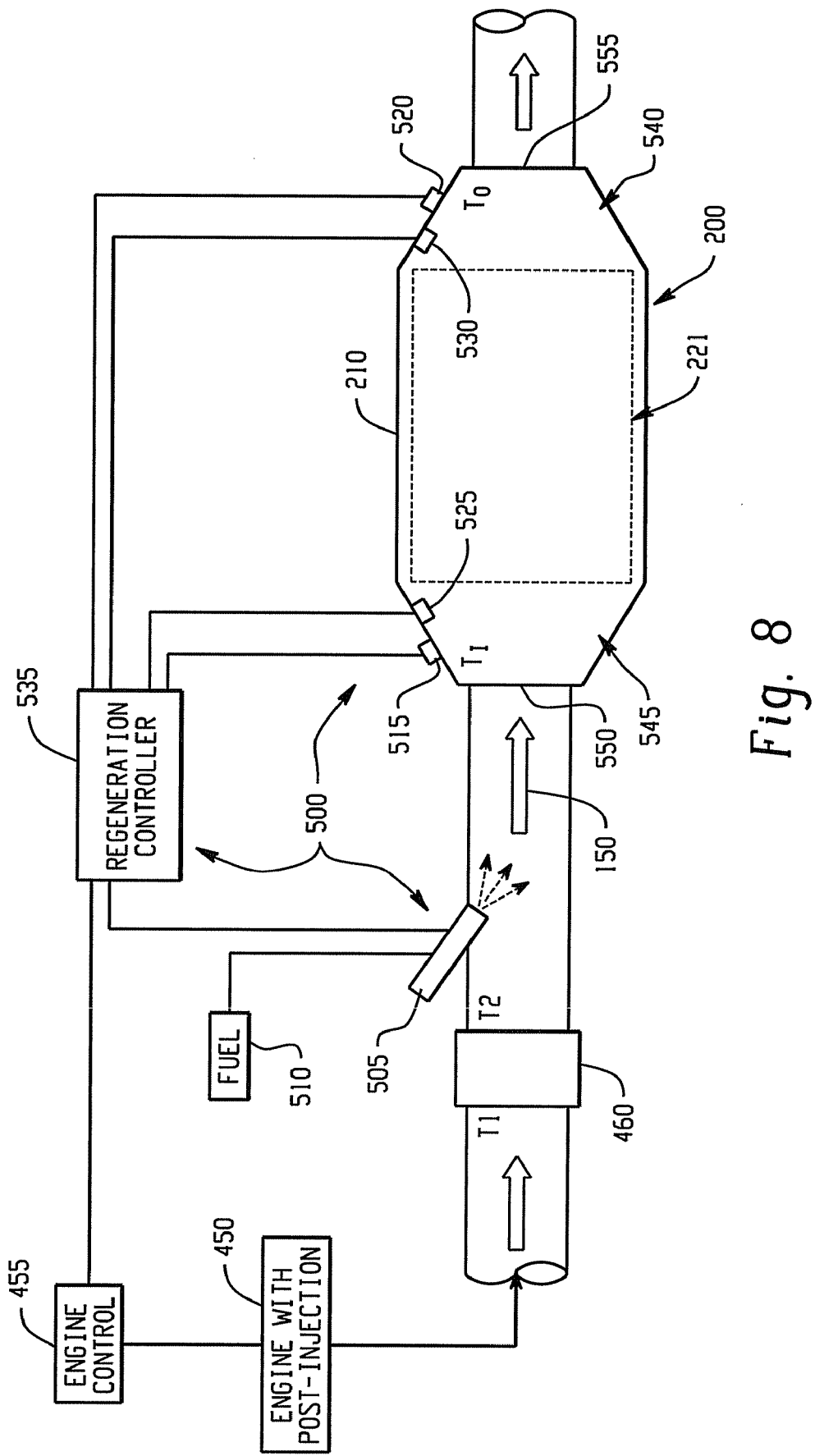
FIG. 8 depicts a control system for regenerating a particulate filter in accordance with an embodiment of the invention.

Referring now to FIG. 8, an alternative embodiment includes a filter element 221 similar to that of element 220 but having a catalyst 405 disposed throughout the length of the interior of the filter, that is, the catalyst is not disposed in a zone arrangement as discussed above. Instead of controlling the regeneration of the filter element by staged regeneration as discussed above, the embodiment of FIG. 8 controls the regeneration of the filter element by introducing hydrocarbon fuel into a hot dpf 200 (the dpf being heated by the exhaust gas temperature, by auxiliary heaters, or a combination of both). The catalyst within the filter element causes the injected hydrocarbon to oxidize, which in turn elevates the internal temperature to a sufficient temperature, 630 degrees Celsius for example, to oxidize any soot trapped therein, thereby serving to cleanse or regenerate the filter element 221.

In an embodiment, the controlled regeneration is managed via an engine 450 with post-combustion fuel injection (herein alternatively referred to as engine fuel injection unit), an engine control unit 455 for controlling the amount of post-combustion fuel injection, an oxidation catalyst 460 for oxidizing the post-injected fuel and raising the exhaust temperature from T1 to T2, and a regeneration control system 500. The control system 500 includes an exhaust fuel injector 505 disposed for injecting a source of hydrocarbon, such as diesel fuel from fuel supply 510 for example, into the exhaust flow 150 upstream of the filter 221, a pair of temperature sensors 515, 520 for sensing a temperature change at the dpf 200 in response to oxidation of the hydrocarbon and a resulting temperature rise within the filter 221, a pair of sensors 525, 530 for sensing an operational parameter indicative of the filter regeneration being complete, such as pressure sensors for sensing a low pressure differential across the inlet 550 and outlet 555 of dpf 200 for example, and a regeneration controller 535 responsive to the temperature sensors 515, 520 for adjusting the amount of hydrocarbon being injected, via injector 505, into the filter to increase the temperature within the filter above a defined threshold starting at the downstream end of the filter. The controller 535 is also responsive to the pressure sensors 525, 530 for deactivating the injector 505 to prevent further injection of the hydrocarbon fuel into the exhaust flow 150 in response to the filter regeneration being complete. A pressure delta for deactivating the injector 505 is determined based on an initial pressure drop reading of a "clean" filter element 221.

By virtue of the direction and fluid flow dynamics of exhaust flow 150, the maximum temperature within dpf 200 is always located near the downstream end 540 of the filter. By controlling the exhaust temperature T2 via engine fuel injection unit 450 and oxidation catalyst 460, and by controlling the amount of hydrocarbon injection into the exhaust flow via injector 505, the temperature profile within dpf 200 can be controlled in such a way that the regeneration threshold temperature can be reached at a location that is moving progressively toward the upstream end 545. By monitoring the temperature differential and pressure differential across dpf 200, the internal temperature of filter element 221 can be controlled for efficient oxidation of the trapped soot.

From the foregoing, it will be appreciated that the amount of injected fuel via engine fuel injection unit 450 is used to control the exhaust temperature T2 at the upstream end 545 of dpf 200, while the amount of injected fuel via exhaust injector 505 is used to control the temperature difference across the dpf 200. The temperature difference across oxidation catalyst 460 is T2-T1, and the temperature difference across dpf 200 is $T_O$-$T_I$. Temperature T2 in FIG. 8 reasonably equates to $T_I$ in FIG. 9, assuming no temperature influence by the injected fuel from exhaust fuel injector 505.

Temperature sensors 515, 520 may be disposed in any convenient location for providing information relating to the internal temperature of dpf 200. In FIG. 8, temperature sensors 515, 520 are illustrated being disposed on an external housing 210 surface of the dpf 200. As a result, a temperature differential between the internal and external temperatures of dpf 200 must be taken into consideration, which can be determined through appropriate design analysis. In an embodiment, this temperature differential may be on the order of 50 degree-Celsius.

In an embodiment, and with reference now to FIG. 9, the regeneration controller 535 is responsive to the temperature sensors 515, 520 for controlling engine control unit 455 and exhaust fuel injector 505 such that the amount of injected fuel via engine fuel injection unit 450 and exhaust fuel injector 505 causes a temperature rise at the upstream end 545 of the filter 221 (see the series of $T_I$ in FIG. 9) to be substantially equal to a temperature rise at the downstream end 540 of the filter 221 (see the series of $T_O$ in FIG. 9), as the internal temperature of the filter 221 rises to or above the threshold temperature (630 degree-Celsius for example). The foregoing scenario is illustrated by the timeline depicted in FIG. 9, which shows three time windows (A, B and C) for the internal temperatures sensed by temperature sensors 515 ($T_I$) and 520 ($T_O$). The internal temperature of filter element 221 is illustrated on the y-axis in equal temperature increments Δ, with the threshold temperature of 630 degree-Celsius being enumerated. As can be seen in FIG. 9, the temperature rise Δ at $T_I$ is equal to the temperature rise Δ at $T_O$ from time window A to time window B, and from time window B to time window C. This substantially equal temperature rise at the upstream and downstream ends of filter 221 is a result of controller 500 controlling the amount of fuel that exhaust fuel injector 505 injects into the exhaust flow 150, which in an embodiment is injected at a substantially constant volumetric flow rate as the exhaust temperature T2 is raised higher via engine fuel injection unit 450 and oxidation catalyst 460.

In another embodiment, and with reference now to FIG. 10, the regeneration controller 535 is responsive to the temperature sensors 515, 520 for controlling engine control unit 455 and exhaust fuel injector 505 such that the amount of injected fuel via engine fuel injection unit 450 and exhaust fuel injector 505 causes a temperature rise at the upstream end 545 of the filter 221 (see the series of $T_I$ in FIG. 10) to be greater than a temperature rise at the downstream end 540 of the filter 221 (see the series of $T_O$ in FIG. 10), as the internal temperature of the filter 221 rises above the threshold temperature (630 degree-Celsius for example). The foregoing scenario is illustrated by the timeline depicted in FIG. 10, which shows three time windows (A, B and C) for the internal temperatures sensed by temperature sensors 515 ($T_I$) and 520 ($T_O$). The internal temperature of filter element 221 is illustrated on the y-axis in equal temperature increments Δ, with the threshold temperature of 630 degree-Celsius being enumerated. As can be seen in FIG. 10, the temperature rise at $T_I$ increases by an amount Δ from time window A to time window B, and from time window B to time window C, while the temperature rise at $T_O$ increases by an amount of less than Δ from time window A to time window B, and from time window B to time window C. This greater temperature rise at the upstream end versus the downstream end of filter 221 is a result of controller 500 controlling the amount of fuel that exhaust fuel injector 505 injects into the exhaust flow 150, which in an embodiment is injected at a volumetric flow rate that reduces with time as the exhaust temperature T2 is raised higher via engine fuel injection unit 450 and oxidation catalyst 460. By controlling the temperature rise along the length of dpf 200 to be just sufficiently at or above the regeneration threshold temperature, it will be appreciated that less fuel will be wasted from unnecessary heating at the downstream end 540 of dpf 200.

Figure 11:
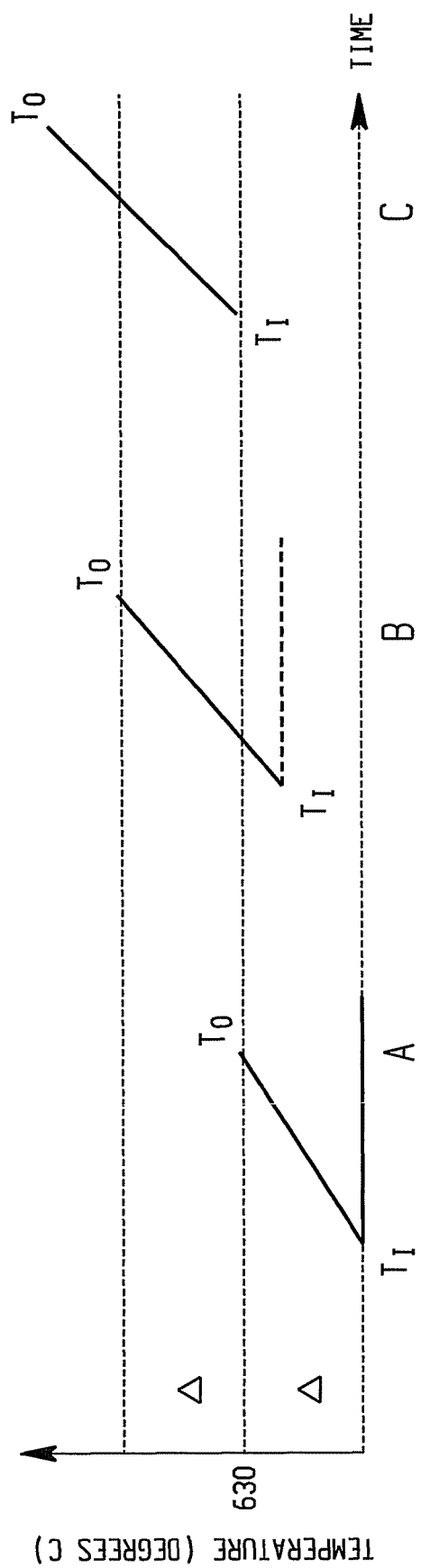

In a third scenario, exhaust fuel injector 505 is eliminated, and regeneration controller 535 is integrated with engine control unit 455 to control the amount of fuel injected via engine fuel injection unit 450. Here, hydrocarbons from post-combustion fuel injection in the engine cylinder are used to raise the exhaust temperature from T1 to T2 across oxidation catalyst 460. However, here oxidation catalyst 460 is sufficiently undersized to allow excess hydrocarbons to pass through and to be oxidized in the dpf 200, thereby causing a temperature rise at $T_I$ and $T_O$ sufficient to cause regeneration from the downstream end 540 to the upstream end 545 of dpf 200. FIG. 11 illustrates this third scenario where the temperature rise at $T_O$ is greater than the temperature rise at $T_I$ as time progresses. Scenario three suggests that there is a tradeoff between reduced system complexity (absence of fuel injector 505) and excess fuel usage ($T_O$ substantially greater than 630 degree-C) to obtain regeneration temperatures along the length of dpf 200.

In all scenarios illustrated in FIGS. 9-11, the threshold temperature of 630 degree-Celsius is reached throughout the filter element 221, thereby resulting in effective oxidation of any soot trapped therein.

In all of the foregoing scenarios, the exhaust temperature T1 must be controllably raised to a value of T2 that is sufficient to initiate regeneration in dpf 200 near the downstream end 540 of the filter in the presence of excess hydrocarbons. Without the excess hydrocarbon, T2 has to be raised to the threshold temperature to initiate the regeneration from the upstream end of the filter and runaway oxidation may result in dpf 200 due to the oxidation of the accumulated soot on the filter. Prior to elevating the exhaust temperature from T1 to T2, and prior to regeneration, an embodiment of the overall system is designed such that the thermodynamic characteristic across dpf 200 results in $T_O$ being less than $T_f$.

To initiate regeneration in dpf 200, the regeneration starts with imposing fuel injection as discussed in the three scenarios above until $T_I$ reaches a defined level (see time sequence A and the lower dashed line in FIGS. 9-11), then imposing fuel injection as discussed in the three scenarios above until $T_O$ reaches the oxidation threshold level (see time sequence A and the center dashed line in FIGS. 9-11 representing the 630 degree-Celsius oxidation temperature), and then imposing sufficient fuel injection as discussed in the three scenarios above until $T_I$ reaches the oxidation threshold level (see time sequence C and the center dashed line in FIGS. 9-11). Time sequence B in FIGS. 9-11 illustrates that the oxidation process is moving upstream from the downstream end 540 toward the upstream end 545 of dpf 200.

In an embodiment, the source of hydrocarbon is provided by the same fuel that is used to fuel the vehicle employing the exhaust system 100. However, it is also contemplated that the vehicle may use one grade of fuel while the source of hydrocarbon for filter regeneration may come from another grade of fuel, thereby enabling the fuel selection to be tailored for the two different systems (the vehicle engine and the exhaust regeneration system) depending on their respective performance characteristics. Since exhaust filter regeneration may be desirable only at defined maintenance intervals, a separate fuel reservoir (generally depicted by reference numeral 510 for example) may be provided specifically for providing the desired quality of hydrocarbon fuel to fuel injector 505.

Figure 12:
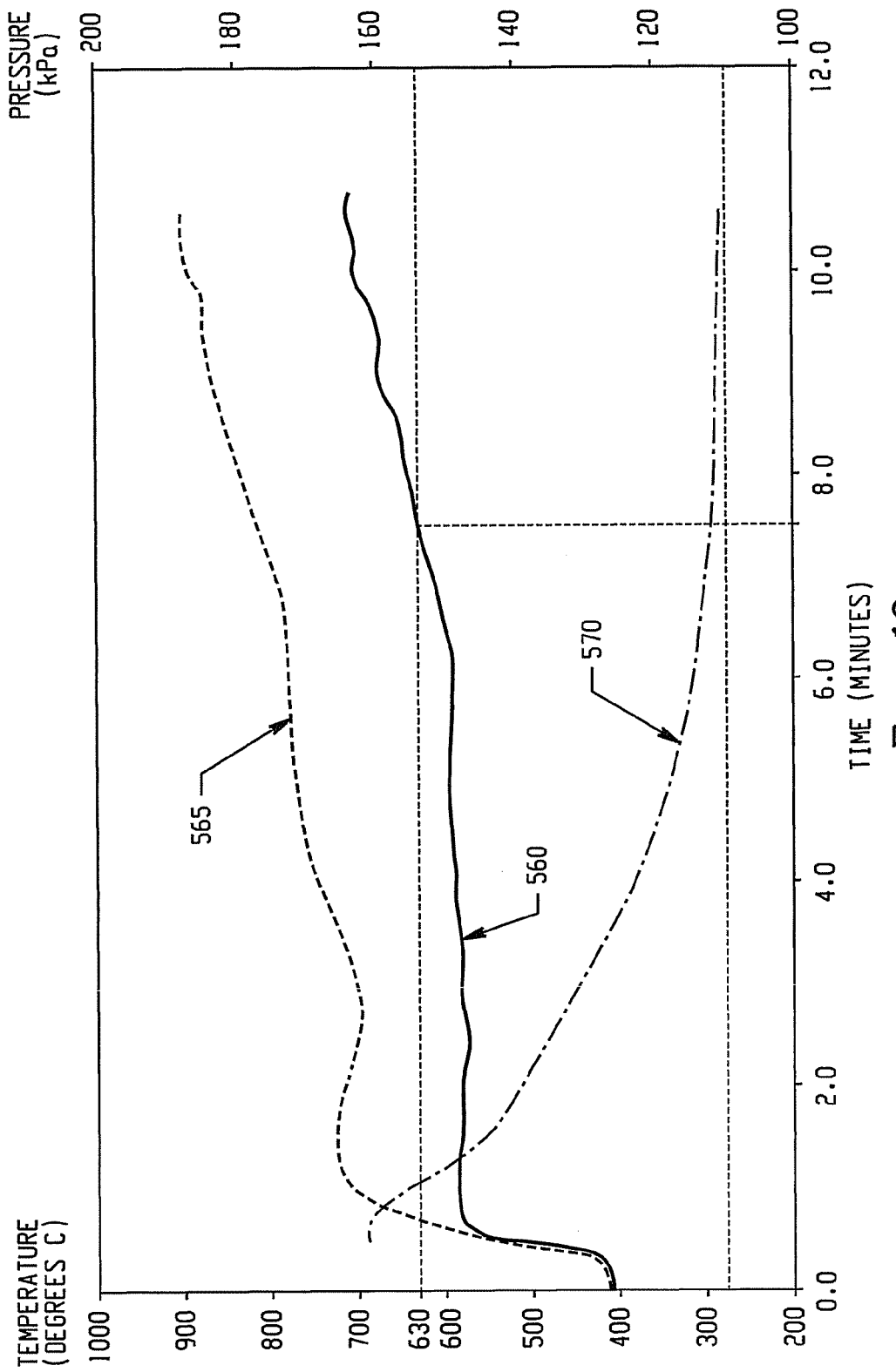
FIG. 12 depicts an artistic rendering of test data illustrative of the performance characteristics of an embodiment of the invention.

While FIGS. 9-11 are illustrative of targeted control scenarios, FIG. 12 is illustrative (via artistic rendering) of actual test data on a clogged filter 221, which shows the filter temperature proximate the inlet 550 via solid line 560, and the filter temperature proximate the outlet 555 via dashed line 565, as a function of time (x axis) during regeneration. The threshold temperature of 630 degree-Celsius is also enumerated. The start (time-zero) temperature of about 400 degree-Celsius is representative of a steady state operating temperature of filter 221 prior to regeneration. Also illustrated in FIG. 12 is a pressure differential reading via pressure sensors 525, 530, which is depicted by dot-dashed line 570. As can be seen in FIG. 12, it takes about 7.5 minutes for the entire filter 221 to reach or exceed the desired threshold temperature of 630 degree-Celsius under controlled regeneration, at which point the pressure upstream of the dpf 200 is tending toward a horizontal asymptote at a pressure of about 110 kPa. Weigh measurement of the dpf 200 before and after the regeneration showed the regeneration to be 100%.

Figure 13:
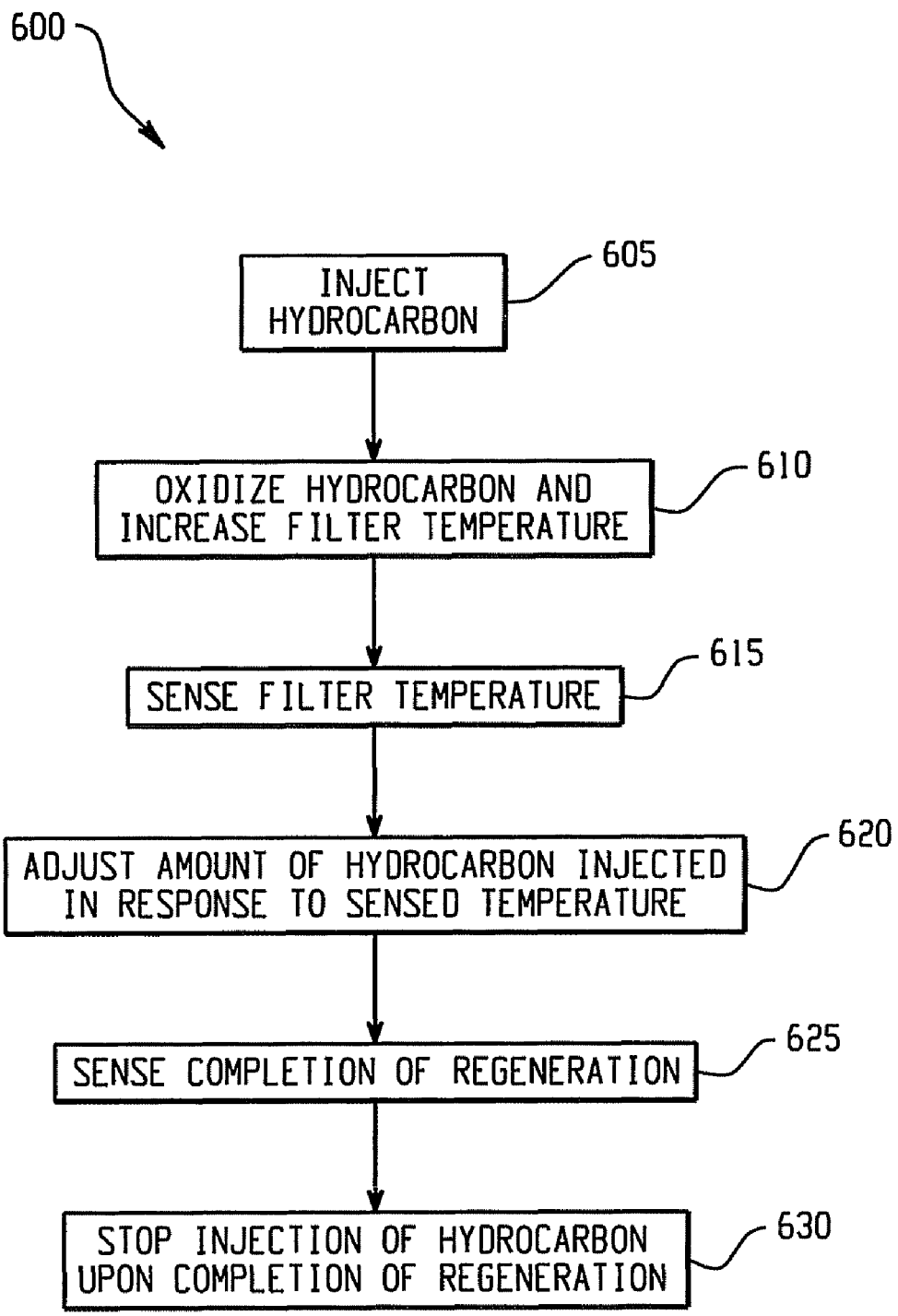
FIG. 13 depicts in flowchart form a method for regenerating a particulate filter in accordance with an embodiment of the invention.

In view of the foregoing description of structure, and with reference now to FIG. 13, a method 600 for regenerating a dpf 200 having a catalyzed filter element 221 is depicted in flowchart form. At block 605, a source of hydrocarbon is injected into the exhaust flow upstream of the filter. At block 610, and in response to the operating temperature of the filter, the injected hydrocarbon within the filter is caused to oxidize and the temperature within the filter to rise. By virtue of the direction of exhaust flow and the fluid dynamics of the exhaust flow, the temperature rise within the filter is initiated at the downstream end of the filter. At block 615, a temperature change at the filter in response to the oxidation of the hydrocarbon is sensed. At block 620, the amount of hydrocarbon being injected into the filter is adjusted to controllably increase the temperature within the filter above a defined threshold from the downstream end to the upstream end of the filter. As discussed above, the defined threshold temperature, such as 630 degree-Celsius, is sufficient to oxidize soot trapped within the filter. As such, the elevated temperature above the defined threshold temperature serves to cleanse or regenerate the filter. At block 625, an operational parameter, such as pressure drop, indicative of the filter regeneration being complete is sensed. At block 630, further injection of the hydrocarbon into the exhaust flow is prevented in response to the sensed operational parameter indicating that regeneration is complete. Other elements of the regeneration method will be appreciated from a reading of the above described structure.

While only two temperature sensors 515, 520 and two pressure sensors 525, 530 have been illustrated and discussed above, it will be appreciated that other quantities of sensors may be employed if a profile other than a linear profile is desired for the temperature and/or pressure profiles.

In view of the foregoing, some embodiments of the invention may include some of the following advantages: reduced peak temperature and therefore reduced thermal stress of the particulate filter 200 through staged regeneration that regenerates the filter beginning at a downstream zone and proceeding to an upstream zone; employing staged regeneration from a downstream zone to an upstream zone allows for regeneration in a direction of the exhaust flow, which is the natural direction of heat flow; less heat accumulation at the rear (exhaust) end of the filter; lowered peak regeneration temperature thereby allowing less frequent regeneration of particulate filter 200; the potential for providing a more durable diesel particulate filter (dpf); the option of using a Cordierite dpf which is much cheaper and weaker, but suitable for the intended purpose disclosed herein using staged regeneration, than the a SiC dpf; and, controlled regeneration of an entire particulate filter via post fuel injection under the control of a controller responsive to temperature and pressure sensors disposed at the particulate filter.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for regenerating a particulate filter for an exhaust system configured to receive an exhaust flow, the method comprising:
   injecting a source of hydrocarbon into the exhaust flow upstream of the filter;
   causing the injected hydrocarbon within the filter to oxidize and a temperature within the filter to rise, the temperature rise being initiated at a downstream end of the filter by virtue of the direction of exhaust flow;
   sensing a temperature change at the filter in response to the oxidation of the hydrocarbon;
   adjusting the amount of hydrocarbon being injected into the filter to increase the temperature within the filter above a defined threshold from the downstream end to an upstream end of the filter, the defined threshold temperature being sufficient to oxidize soot, the elevated temperature above the defined threshold temperature thereby serving to regenerate the filter;

adjusting the amount of injected hydrocarbon to cause a temperature rise at the upstream end of the filter to be substantially equal to or greater than a temperature rise at the downstream end of the filter as the internal filter temperature rises above the threshold temperature;

sensing an operational parameter indicative of the filter regeneration being complete; and preventing further injection of the hydrocarbon into the exhaust flow in response to the sensed operational parameter.

2. The method of claim 1, wherein:
the defined threshold temperature is 630 degrees Celsius.

3. The method of claim 1, wherein:
the source of hydrocarbon is a fuel used to fuel a vehicle employing the exhaust system.

4. The method of claim 1, wherein:
the filter comprises a catalyst for oxidizing the hydrocarbon and soot.

5. The method of claim 1, wherein:
the sensed operational parameter is a pressure drop across the inlet and outlet of the filter.

6. The method of claim 1, wherein the adjusting the amount of hydrocarbon being injected into the filter comprises:
adjusting the amount of injected hydrocarbon to cause a temperature rise at the upstream end of the filter to be substantially equal to a temperature rise at the downstream end of the filter as the internal filter temperature rises above the threshold temperature.

7. The method of claim 1, wherein the adjusting the amount of hydrocarbon being injected into the filter comprises:
adjusting the amount of injected hydrocarbon to cause a temperature rise at the upstream end of the filter to be greater than a temperature rise at the downstream end of the filter as the internal filter temperature rises above the threshold temperature.

8. The method of claim 1, further comprising:
controllably elevating the exhaust temperature at a location prior to the injecting a source of hydrocarbon into the exhaust flow upstream of the filter.

9. The method of claim 1, wherein:
the sensed temperature change is a temperature change on an external housing surface of the filter.

10. The method of claim 9, wherein:
the sensed temperature change is a temperature change between two temperature sensors, one proximate the outlet of the filter and another proximate the inlet of the filter.

11. A control system for regenerating a particulate filter for an exhaust system configured to receive an exhaust flow, the control system comprising:
a fuel injector disposed for injecting a source of hydrocarbon into the exhaust flow upstream of the filter;
a temperature sensor for sensing a temperature change at the filter in response to oxidation of the hydrocarbon and a resulting temperature rise within the filter, the temperature rise being initiated at a downstream end of the filter by virtue of the direction of exhaust flow;
a controller responsive to the temperature sensor for adjusting the amount of hydrocarbon being injected into the filter to increase the temperature within the filter above a defined threshold from the downstream end to an upstream end of the filter, the defined threshold temperature being sufficient to oxidize soot, the elevated temperature above the defined threshold temperature thereby serving to regenerate the filter;

the controller being responsive to the temperature sensor for adjusting the amount of injected hydrocarbon from the fuel injector to cause a temperature rise at the upstream end of the filter to be substantially equal to or greater than a temperature rise at the downstream end of the filter as the internal filter temperature rises above the threshold temperature; and a sensor for sensing an operational parameter indicative of the filter regeneration being complete;

wherein the controller is responsive to the sensed operational parameter to prevent further injection of the hydrocarbon into the exhaust flow in response to the filter regeneration being complete.

12. The control system of claim 11, wherein:
the defined threshold temperature is 630 degrees Celsius.

13. The control system of claim 11, wherein:
the source of hydrocarbon is a fuel used to fuel a vehicle employing the exhaust system.

14. The control system of claim 11, wherein:
the filter comprises a catalyst for oxidizing the hydrocarbon and soot.

15. The control system of claim 11, wherein:
the sensor for sensing an operational parameter is a pressure sensor disposed for sensing a pressure drop across the inlet and outlet of the filter.

16. The control system of claim 11, wherein:
the controller is responsive to the temperature sensor for adjusting the amount of injected hydrocarbon from the fuel injector to cause a temperature rise at the upstream end of the filter to be substantially equal to a temperature rise at the downstream end of the filter as the internal filter temperature rises above the threshold temperature.

17. The control system of claim 11, wherein:
the controller is responsive to the temperature sensor for adjusting the amount of injected hydrocarbon from the fuel injector to cause a temperature rise at the upstream end of the filter to be greater than a temperature rise at the downstream end of the filter as the internal filter temperature rises above the threshold temperature.

18. The control system of claim 11, wherein the exhaust system comprises an oxidation catalyst upstream of the fuel injector, the control system further comprising:
an engine fuel injection unit disposed upstream of the oxidation catalyst and responsive to the controller for introducing unburned hydrocarbons into the exhaust system upstream of the oxidation catalyst, thereby resulting in a temperature increase of the exhaust flow stream across the oxidation catalyst sufficient to initiate regeneration within the particulate filter.

19. The control system of claim 11, wherein:
the temperature sensor is disposed on an external housing surface of the filter.

20. The control system of claim 19, wherein:
the temperature sensor comprises a first temperature sensor disposed proximate the outlet of the filter and a second temperature sensor disposed proximate the inlet of the filter, the sensed temperature change being a temperature change between the first and second temperature sensors.

* * * * *